United States Patent
Horvát et al.

(10) Patent No.: US 12,316,265 B2
(45) Date of Patent: *May 27, 2025

(54) METHOD OF DETERMINING A POSITION OF A ROTOR OF A BRUSHLESS PERMANENT MAGNET MOTOR

(71) Applicant: Dyson Technology Limited, Wiltshire (GB)

(72) Inventors: Máté Horvát, Swindon (GB); Xiaoxu Zhang, Bristol (GB)

(73) Assignee: Dyson Technology Limited, Malmesbury (GB)

( * ) Notice: Subject to any disclaimer, the term of this patent is extended or adjusted under 35 U.S.C. 154(b) by 127 days.

This patent is subject to a terminal disclaimer.

(21) Appl. No.: 18/026,922

(22) PCT Filed: Sep. 22, 2021

(86) PCT No.: PCT/GB2021/052455
§ 371 (c)(1),
(2) Date: Mar. 17, 2023

(87) PCT Pub. No.: WO2022/064188
PCT Pub. Date: Mar. 31, 2022

(65) Prior Publication Data
US 2023/0327587 A1    Oct. 12, 2023

(30) Foreign Application Priority Data

Sep. 25, 2020 (GB) .................................... 2015194
Feb. 25, 2021 (GB) .................................... 2102698

(51) Int. Cl.
*H02P 6/182* (2016.01)
*H02P 6/20* (2016.01)
(Continued)

(52) U.S. Cl.
CPC .......... *H02P 6/182* (2013.01); *H02P 23/0031* (2013.01); *H02P 25/026* (2013.01); *H02P 27/08* (2013.01); *H02P 2207/05* (2013.01)

(58) Field of Classification Search
CPC .. H02P 6/182; H02P 6/20; H02P 27/08; H02P 25/03
See application file for complete search history.

(56) References Cited

U.S. PATENT DOCUMENTS

| 8,212,508 B2 * | 7/2012 | Paintz | ..................... | H02P 6/182 |
| | | | | 318/400.34 |
| 9,692,331 B2 * | 6/2017 | Brown | ..................... | H02P 6/182 |
| (Continued) | | | | |

FOREIGN PATENT DOCUMENTS

| EP | 2876807 A2 | 5/2015 |
| GB | 2501370 A | 10/2013 |
| (Continued) | | |

OTHER PUBLICATIONS

Examination Report received for GB Application No. 2015194.0, mailed on Aug. 23, 2022, 1 page.
(Continued)

*Primary Examiner* — Thai T Dinh
(74) *Attorney, Agent, or Firm* — Tucker Ellis LLP

(57) ABSTRACT

A method of determining a position of a rotor of a brushless permanent magnet motor includes measuring a current value indicative of current flowing through a phase winding of the motor and providing a reference voltage value indicative of a voltage applied to the phase winding of the motor. The method includes calculating a phase of back EMF induced in the phase winding using the measured current value and the reference voltage value, and determining a zero-crossing point of the back EMF induced in the phase winding using the calculated phase of back EMF induced in the phase
(Continued)

winding. The method includes generating a rotor position signal based on the determined zero-crossing point.

24 Claims, 8 Drawing Sheets

(51) Int. Cl.
*H02P 23/00* (2016.01)
*H02P 25/026* (2016.01)
*H02P 25/03* (2016.01)
*H02P 27/08* (2006.01)

(56) References Cited

U.S. PATENT DOCUMENTS

| | | | |
|---|---|---|---|
| 9,716,454 B2* | 7/2017 | Huang | H02P 23/0009 |
| 12,015,368 B2* | 6/2024 | Shmidt | H02P 6/181 |
| 2005/0206341 A1* | 9/2005 | Yin Ho | H02P 8/12 318/812 |
| 2007/0120519 A1 | 5/2007 | Sakamoto et al. | |
| 2009/0096397 A1* | 4/2009 | Paintz | H02P 6/182 318/400.35 |
| 2015/0145455 A1* | 5/2015 | Heynlein | H02P 6/182 318/400.35 |
| 2015/0254766 A1* | 9/2015 | Abramowitz | G06Q 40/03 705/38 |
| 2017/0085196 A1 | 3/2017 | Huang et al. | |
| 2017/0170759 A1 | 6/2017 | Fitzpatrick et al. | |
| 2018/0115263 A1 | 4/2018 | Buckley et al. | |
| 2022/0352834 A1 | 11/2022 | Shmidt | |
| 2024/0072700 A1* | 2/2024 | Horvát | H02M 1/38 |

FOREIGN PATENT DOCUMENTS

| | | |
|---|---|---|
| GB | 2582612 A | 9/2020 |
| WO | 2022/064188 A1 | 3/2022 |

OTHER PUBLICATIONS

Examination Report received for GB Application No. 2102698, mailed on Aug. 23, 2022, 1 page.
Fakham et al., "Design and practical implementation of a back-EMF sliding-mode observer for a brushless DC motor," IET Electric Power Applications, vol. 2, No. 6, Nov. 1, 2008, pp. 353-361.
Galotto et al., "Tri-state Space Vector Modulation for Three-phase integrated inverters," XI Brazilian Power Electronics Conference, Sep. 11, 2011, pp. 911-917.
International Search Report and Written Opinion received for PCT Patent Application No. PCT/GB2021/052455, mailed on Jan. 12, 2022, 13 pages.
Search Report received for GB Application No. 2102698.4, mailed on Aug. 10, 2021, 1 page.
Yang et al., "Low cost sensorless vector control for PMSM compressors," International Conference on Electrical Machines and Systems, Oct. 17, 2008, pp. 1456-1459.
Zambada et al., "Sensorless Field Oriented Control of a PMSM," Microchip: AN1078, May 1, 2010, 28 pages.

* cited by examiner

METHOD OF DETERMINING A POSITION OF A ROTOR OF A BRUSHLESS PERMANENT MAGNET MOTOR

CROSS-REFERENCE TO PRIOR APPLICATION

This application is a § 371 National Stage Application of PCT International Application No. PCT/GB2021/052455 filed Sep. 22, 2021, which claims the priority of United Kingdom Application No. 2015194.0, filed Sep. 25, 2020, and United Kingdom Application No. 2102698.4, filed Feb. 25, 2021, each of which are herein incorporated by reference in their entirety.

FIELD OF THE INVENTION

The present invention relates to a method of determining a position of a rotor of a brushless permanent magnet motor

BACKGROUND OF THE INVENTION

Knowledge of a position of a rotor of a brushless permanent magnet motor, particularly a three-phase brushless permanent magnet motor, is vital in order to apply the correct control voltages to a winding of the motor. Some brushless permanent magnet motors include sensors, for example Hall sensors, which output a signal indicative of the rotor position.

Although the component cost of the sensor may be relatively cheap, integrating the sensor within the motor often complicates the design and manufacture of the motor. Additionally, the signal output by the sensor is often susceptible to electromagnetic noise generated within the motor.

SUMMARY OF THE INVENTION

According to a first aspect of the present invention there is provided a method of determining a position of a rotor of a brushless permanent magnet motor, the method comprising measuring a current value indicative of current flowing through a phase winding of the motor, providing a reference voltage value indicative of a voltage applied to the phase winding of the motor, calculating a phase of back EMF induced in the phase winding using the measured current value and the reference voltage value, determining a zero-crossing point of the back EMF induced in the phase winding using the calculated phase of back EMF induced in the phase winding, and generating a rotor position signal based on the determined zero-crossing point.

The method according to the first aspect of the present invention may be advantageous as the method comprises calculating a phase of back EMF induced in the phase winding using the measured current value and the reference voltage value, determining a zero-crossing point of the back EMF induced in the phase winding using the calculated phase of back EMF induced in the phase winding, and generating a rotor position signal based on the determined zero-crossing point.

In particular, the back EMF of a brushless permanent magnet motor may have a substantially sinusoidal form, and it may be possible to obtain an amplitude and a frequency of back EMF induced in the phase winding from past measurement or simulation, or from real-time calculation. By calculating a phase of back EMF induced in the phase winding using the measured current value and the reference voltage value, this information can then be used in conjunction with the known amplitude and frequency to provide a relatively accurate representation of a waveform of the back EMF induced in the phase winding. The representation of a waveform of the back EMF induced in the phase winding may then be used to determine a zero-crossing point of the back EMF induced in the phase winding, and hence to generate a rotor position signal.

The method may be carried out using software, for example rather than using hardware. Hence component number and/or overall cost of a control system to implement the method according to the first aspect of the present invention may be reduced, for example relative to a scheme where zero-crossings of back EMF are predicted or calculated using hardware.

By a zero-crossing point of back EMF induced in the phase winding is meant a point at which the value of the back EMF hits zero during a transition between a positive polarity back EMF value and a negative polarity back EMF value, or vice versa.

The phase of back EMF induced in the phase winding may comprise a phase shift of the back EMF induced in the phase winding relative to a voltage applied to the phase winding.

The method may comprise determining an aligned position of the rotor when the back EMF induced in the phase winding is at the zero-crossing point. By an aligned position is meant a position at which the rotor is aligned between two opposing magnetic poles defined by the motor, for example a position at which a permanent magnet attached to the rotor is aligned between two opposing magnetic poles defined by a stator of the motor.

The method may comprise determining a rotor position of 0 electrical degrees when the back EMF induced in the phase winding is at the zero-crossing point.

The brushless permanent magnet motor may comprise a plurality of phase windings, and the method may comprise measuring a current value indicative of current flowing through only one phase winding of the motor, providing a reference voltage value indicative of a voltage applied to the only one phase winding of the motor, calculating a phase of back EMF induced in the only phase winding using the measured current value and the reference voltage value, determining a zero-crossing point of the back EMF induced in the only one phase winding using the calculated phase of back EMF induced in the phase winding, and generating a rotor position signal based on the determined zero-crossing point.

A number of circuitry components, for example for measurement of the current value indicative of current flowing through a phase winding, may be reduced by utilising only one phase winding to generate a rotor position signal. For example, where it is desired to measure current values indicative of current flowing through each phase winding of the motor a number of distinct current measurement devices may be required.

The brushless permanent magnet motor may comprise a plurality of phase windings, and the method may comprise measuring a plurality of current values each indicative of current flowing through a respective phase winding of the motor, providing a plurality of reference voltage values each indicative of a voltage applied to the respective phase winding of the motor, calculating a phase of back EMF induced in each phase winding using the respective measured current value and the respective reference voltage value, determining a zero-crossing point of the back EMF induced in each phase winding using the calculated phase of back EMF induced in the phase winding, and generating a rotor position signal based on the determined zero-crossing points.

By utilising each of the plurality of phase windings to generate a rotor position signal a more accurate knowledge of rotor position may be obtained, and, for example, a rotor position signal provided to a controller of the brushless permanent magnet motor may be updated more frequently.

The motor may comprise a three-phase brushless permanent magnet motor, for example comprising three phase windings. The three phase windings of the brushless permanent magnet motor may be connected in a star configuration, or a delta configuration.

Where the phase windings are connected in a star configuration, measuring a current value indicative of current flowing through a phase winding of the motor may comprise measuring phase current flowing through the phase winding, and providing a reference voltage value indicative of a voltage applied to the phase winding of the motor may comprise providing a reference voltage value indicative of a phase voltage applied to the phase winding.

Where the phase windings are connected in a delta configuration, measuring a current value indicative of current flowing through a phase winding of the motor may comprise measuring a line-to-line current flowing through the phase winding, and providing a reference voltage value indicative of a voltage applied to the phase winding of the motor may comprise providing a reference voltage value indicative of a line-to-line voltage applied to the phase winding.

A phase of back EMF induced in the phase winding may be calculated using the equation:

$$-E_{phX} \propto I_{phX}R_{phX} + (L_{selfphX} - L_{mutualphX})\frac{dI_{phX}}{dt} - V_{phX};$$

where $E_{phX}$ is the back EMF induced in the phase winding X, $L_{selfphX}$ is the self-inductance of the phase winding X, $L_{mutualphX}$ is the mutual inductance of the phase winding X with other phase windings of the motor, $R_{phX}$ is the current value indicative of current flowing through the phase winding X, $R_{phX}$ is the resistance of the phase winding X, and $V_{phX}$ is the reference voltage value indicative of the voltage applied to the phase winding X.

Determining a zero-crossing point of the back EMF induced in the phase winding using the calculated phase of back EMF induced in the phase winding may comprise determining a past zero-crossing point of the back EMF induced in the phase winding, and generating a rotor position signal based on the determined zero-crossing point may comprise generating a rotor position signal based on the past zero-crossing point.

Determining a zero-crossing point of the back EMF induced in the phase winding using the calculated phase of back EMF induced in the phase winding may comprise determining a future zero-crossing point of the back EMF induced in the phase winding, and generating a rotor position signal based on the determined zero-crossing point may comprise generating a rotor position signal based on the future zero-crossing point.

Generating a rotor position signal based on the determined zero-crossing point may comprise updating a pre-existing rotor position signal based on the determined zero-crossing point.

Determining an aligned position of the rotor of the brushless permanent magnet motor when the back EMF induced in the phase winding is at the zero-crossing point may comprise determining a past aligned position of the rotor when the back EMF is at a past zero-crossing point. For example, determining a zero-crossing point of the back EMF induced in the phase winding using the calculated phase of back EMF induced in the phase winding may comprise determining a past zero-crossing point of the back EMF induced in the phase winding. This may allow a rotor position signal provided to a controller of the brushless permanent magnet motor to be updated after a determination of the past zero-crossing point has been made.

Determining an aligned position of the rotor of the brushless permanent magnet motor when the back EMF induced in the phase winding is at the zero-crossing point may comprise determining a future aligned position of the rotor when the back EMF is at a future zero-crossing point. For example, determining a zero-crossing point of the back EMF induced in the phase winding using the calculated phase of back EMF induced in the phase winding may comprise determining a future zero-crossing point of the back EMF induced in the phase winding.

The back EMF induced in the phase winding may comprise a sinusoidal waveform, for example having an amplitude and a frequency. Determining a zero-crossing point of the back EMF induced in the phase winding may comprise utilising any or any combination of a calculated phase of back EMF induced in the phase winding, an amplitude representative of the amplitude of back EMF induced in the phase winding, and a frequency representative of the frequency of back EMF induced in the phase winding.

An amplitude representative of the amplitude of back EMF induced in the phase winding may comprise a pre-determined amplitude, and/or a frequency representative of the frequency of back EMF induced in the phase winding may comprise a pre-determined frequency. For example, a pre-determined amplitude and/or a pre-determined frequency may be obtained by prior measurement or simulation, and may be stored in memory of a controller of the brushless permanent magnet motor. An amplitude representative of the amplitude of back EMF induced in the phase winding may comprise a calculated amplitude, for example calculated in real time, and/or a frequency representative of the frequency of back EMF induced in the phase winding may comprise a calculated frequency, for example calculated in real time. The amplitude representative of the amplitude of back EMF induced in the phase winding, and/or the frequency representative of the frequency of back EMF induced in the phase winding may be speed-dependent. For example, a higher speed of rotation of the rotor of the brushless permanent magnet motor may result in a larger amplitude and/or frequency.

Calculating a phase of back EMF induced in the phase winding may comprise integrating the equation:

$$-E_{phX} \propto I_{phX}R_{phX} + (L_{selfphX} - L_{mutualphX})\frac{dI_{phX}}{dt} - V_{phX};$$

to obtain a relationship representative of integrated back EMF, for example a relationship between integrated back EMF, integrated and/or instantaneous current flowing through the phase winding, and integrated voltage applied to the phase winding. Integrating the equation may comprise integrating the equation between boundaries set by a phase angle at the beginning and end of a series of excitation pulses applied to the phase winding.

Calculating a phase of back EMF induced in the phase winding may comprise equating the integrated back EMF to an integral of a sinusoidal waveform representative of back EMF induced in the phase winding. Calculating a phase of back EMF induced in the phase winding may comprise equating a relationship representative of integrated back EMF with an integral of a sinusoidal waveform representative of back EMF induced in the phase winding.

The method may comprise utilising a determined zero-crossing point of back EMF induced in the phase winding to calculate an electrical period of the rotor. For example, the method may comprise utilising past and future determined zero-crossing points to calculate an electrical period of the rotor. The method may comprise utilising a determined zero-crossing point of back EMF induced in the phase winding to calculate a speed of the rotor.

The method may comprise utilising a determined zero-crossing point of back EMF induced in the phase winding to generate a signal representing continuous position of the rotor. For example, the method may comprise utilising past and future determined zero-crossing points and a calculated speed of the rotor to generate a signal representing continuous position of the rotor The method may comprise controlling a voltage applied to the phase winding of the motor based on the signal representing continuous position of the rotor. For example, the method may comprise controlling the voltage applied to the phase winding of the motor using space vector pulse width modulation.

The method may comprise controlling the voltage using 5-step space vector pulse width modulation. Use of 5-step space vector pulse width modulation may be beneficial compared to, for example, 7-step space vector pulse width modulation, as it may not be possible to measure a current value indicative of current flowing through a phase winding of the motor during free-wheeling of high-side switches of an inverter of the motor which typically takes place in 7-step space vector pulse width modulation. Thus use of 5-step space vector pulse width modulation may allow for simpler control arrangements than, for example, a corresponding scheme that utilises 7-step space vector pulse width modulation.

The method may comprise obtaining the reference voltage value from a look-up table based on at least one of a measured DC link voltage and a calculated rotor speed, for example based on both measured DC link voltage and a calculated rotor speed. The reference voltage value may comprise a sinusoidal voltage value.

The method may comprise calculating a reference back EMF waveform, and calculating an error offset for the determined zero-crossing point of back EMF induced in the phase winding using the reference back EMF waveform. This may account for errors introduced in the determination of the zero-crossing point. The calculated reference back EMF waveform may be dependent on the reference voltage value.

The method may further comprise controlling the brushless permanent magnet motor to obtain a desired power, for example a desired rotor power or a desired DC link power, using a closed feedback loop. The closed feedback loop may adjust a speed of the rotor based on a comparison of a power reference to a calculated power value.

The method may comprise determining an initial back emf zero-crossing point and an initial rotor speed in an initialisation step, and generating the rotor position signal based on the initial back emf zero-crossing point and the initial rotor speed. For example, in control of brushless permanent magnet motors, it is common to apply different control schemes at different points of operation, such as an acceleration control scheme to accelerate the motor quickly to a certain speed, before applying a different control scheme. The controller may be required to transition from an initial control scheme to that of the method previously described, and setting such initial values may enable this transition.

Determining the initial back emf zero-crossing point may comprise turning off all power switches of the brushless permanent magnet motor, monitoring a phase voltage of the phase winding of the motor, and utilising a zero-crossing point of the phase voltage as the initial back emf zero-crossing point. This may enable the initial back emf zero-crossing point to be determined.

Determining the initial back emf zero-crossing point may comprise turning off all power switches of the brushless permanent magnet motor, monitoring the phase voltage of the phase winding of the motor to determine at least two zero-crossing points of the phase voltage, and utilising the most recent zero-crossing point of the phase voltage as the initial back emf zero-crossing point.

Determining the initial rotor speed may comprise utilising the most recent zero-crossing point of the phase voltage and a previously determined zero-crossing point of the phase voltage, and calculating a time period between the most recent zero-crossing point of the phase voltage and the previously determined zero-crossing point of the phase voltage.

Determining the initial rotor speed may comprise utilising two consecutive determined zero-crossing points of the phase voltage, for example consecutive zero-crossing points of the same or differing polarity transitions of the phase voltage, and calculating a time period between the two consecutive zero-crossing points of the phase voltage.

The initialisation step may take place prior to determining a position of a rotor of a brushless permanent magnet motor, the method comprising measuring a current value indicative of current flowing through a phase winding of the motor, providing a reference voltage value indicative of a voltage applied to the phase winding of the motor, calculating a phase of back EMF induced in the phase winding using the measured current value and the reference voltage value, determining a zero-crossing point of the back EMF induced in the phase winding using the calculated phase of back EMF induced in the phase winding, and generating a rotor position signal based on the determined zero-crossing point.

According to a second aspect of the present invention there is provided a brushless permanent magnet motor comprising a controller configured to obtain a current value indicative of current flowing through a phase winding of the motor, obtain a reference voltage value indicative of a voltage applied to the phase winding of the motor, calculate a phase of back EMF induced in the phase winding using the measured current value and the reference voltage value, determine a zero-crossing point of the back EMF induced in the phase winding using the calculated phase of back EMF induced in the phase winding, and use the calculated phase of back EMF induced in the phase winding to generate a rotor position signal.

According to a third aspect of the present invention there is provided a data carrier comprising machine readable instructions for the operation of a controller of a brushless permanent magnet motor to obtain a current value indicative of current flowing through a phase winding of the motor, obtain a reference voltage value indicative of a voltage applied to the phase winding of the motor, calculate a phase of back EMF induced in the phase winding using the measured current value and the reference voltage value, determine a zero-crossing point of the back EMF induced in the phase winding using the calculated phase of back EMF induced in the phase winding, and use the calculated phase of back EMF induced in the phase winding to generate a rotor position signal.

Optional features of aspects of the present invention may be equally applied to other aspects of the present invention, where appropriate.

DETAILED DESCRIPTION OF THE INVENTION

Figure 1:
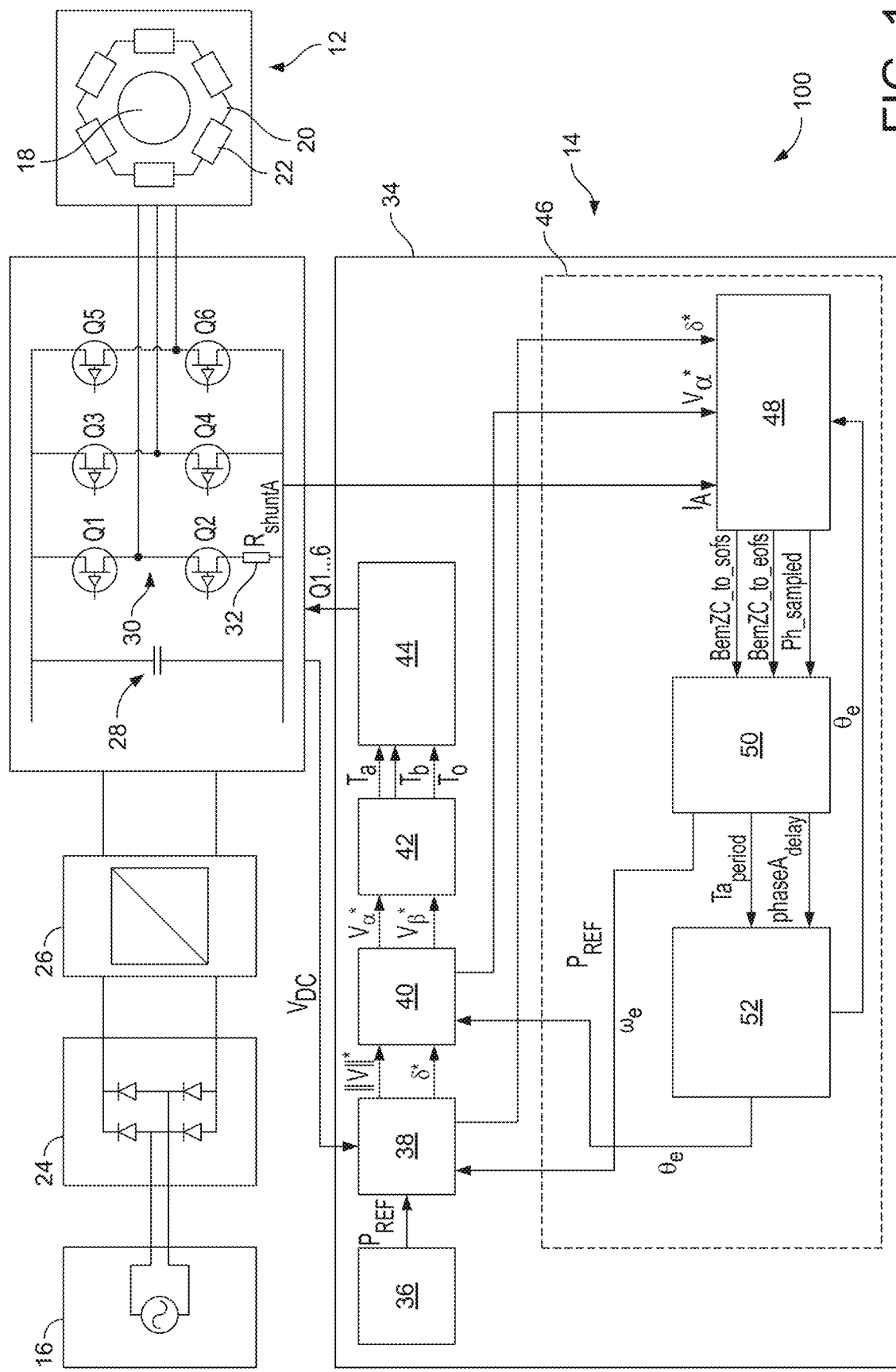
FIG. 1 is a schematic diagram illustrating a first embodiment of a motor system according to the present invention.

A motor system, generally designated 10, is illustrated schematically in FIG. 1. The motor system 10 comprises a three-phase brushless permanent magnet motor 12 and a control system 14. As shown in FIG. 1, the motor system 10 is powered by an AC mains power supply 16.

The motor 12 comprises a two-pole permanent magnet rotor 18 that rotates relative to a stator 20 having six coils. It will be appreciated by a person skilled in the art that the teachings referred to herein will be generally applicable to motors having different number of rotor poles and stator coils. Conductive wires are wound about the stator 20 to form three phase windings 22 connected in either of a so-called "star configuration", ie with the three phase windings 22 coupled together with a common neutral node, or in a so-called "delta configuration", ie with an end of one winding couple to a beginning of another winding or vice versa. The three phase windings 22 will be referred to herein as phase A, phase B, and phase C, although it will be appreciated that other notation, for example U, V, W, may also be used.

The control system 14 comprises a rectifier 24, a DC-DC boost converter 26, a DC link filter 28, an inverter 30, a current sensor 32, and a controller 34.

The rectifier 24 is a full-wave bridge of diodes that rectifies the output of the AC mains power supply 12 to provide a DC link voltage.

The DC-DC boost converter 26 is any appropriate boost converter that boosts the DC link voltage and supplies the boosted DC link voltage to the inverter 30. In some embodiments it will be appreciated that the DC-DC boost converter may be omitted.

The DC link filter 28 comprises a capacitor that smooths the relatively high frequency ripple that arises from switching of the inverter 30.

The inverter 30 comprises a full bridge of six power switches Q1-Q6 that couple the DC link voltage to the phase windings 22. The power switches Q1-Q6 are controlled in response to signals provided by the controller 34, as will be described in more detail hereafter.

The current sensor 32 in FIG. 1 comprises a shunt resistor $R_{shuntA}$ located on a low side of the leg of the inverter 30 corresponding to the windings of phase A.

The controller 34 controls operation of the power switches Q1-Q6 of the inverter 30 in a manner that will be described in further detail below. The controller 34 comprises a microcontroller having a processor, a memory device, and a plurality of peripherals (for example ADC, comparators, timers etc). The memory device stores instructions for execution by the processor, as well as control parameters for use by the processor.

As seen in FIG. 1, the controller 34 operates a plurality of control blocks to control the motor 12. Whilst shown in FIG. 1 as control blocks forming part of the controller 34, it will be appreciated that embodiments where the control blocks are stored and/or run on separate components to the controller 34 are also envisaged.

The control blocks of FIG. 1 comprise a power lookup table 36, a 3D lookup table 38, a voltage reference generator 40, a switching timing generator 42, a switching controller 44, and a rotor position calculator 46.

The motor 12 of FIG. 1 is controlled to obtain a desired power, and so the controller 34 obtains a reference power $P_{REF}$ from the power lookup table 36. The reference power $P_{REF}$, along with an estimated speed of the rotor $\omega_e$, the calculation of which will be described hereinafter, and a DC link voltage $V_{DC}$, are used to index the 3D lookup table 38 to obtain a desired voltage magnitude $\|v\|^*$ and a desired voltage phase $\delta^*$.

The desired voltage magnitude $\|v\|^*$ and the desired voltage phase $\delta^*$ are passed to the voltage reference generator 40, along with an estimated rotor position signal $\theta_e$, the calculation of which will be discussed hereafter, and the DC link voltage $V_{DC}$. The voltage reference generator 40 generates an orthogonal representation on α-β axes of the voltages to be applied to each of the three phase windings 22, with the orthogonal voltages denoted $v_\alpha^*$ and $v_\beta^*$. The orthogonal voltages $v_\alpha^*$ and $v_\beta^*$ are calculated as shown below:

$$v_\alpha^* = \frac{\|v\|^* \cdot \sin\left(\theta_e + \delta^* - \pi + +\frac{T_s}{2} \cdot \omega_e\right)}{V_{DC}}$$

$$v_\beta^* = \frac{\|v\|^* \cdot \sin\left(\theta_e + \delta^* - \frac{3\pi}{2} + +\frac{T_s}{2} \cdot \omega_e\right)}{V_{DC}}$$

where $\|v\|^*$ is the desired voltage magnitude, $\theta_e$ is the estimated rotor position signal, $\delta^*$ is the desired phase voltage, $T_s$ is $1/f_{sw}$ with $f_{sw}$ being the sampling frequency, and $\omega_e$ is the estimated speed of the rotor.

The orthogonal voltages $v_\alpha^*$ and $v_\beta^*$ are passed to the switching timing generator 42, which is configured to generate switching timings $T_a$, $T_b$, $T_0$ according to a 5-step space vector pulse width modulation method.

The switching timings $T_a$, $T_b$, $T_0$ have the following relationship:

$$T_0 = T_s - T_a - T_b$$

The switching timings $T_a$ and $T_b$ are calculated using the following relationships:

$$vREF_{position} = \theta_e + \left(\delta^* - \frac{3}{2}\pi + \left(\frac{T_s}{2} \cdot \omega_e\right)\right)$$

$$m = \|v\|^* \frac{\sqrt{3}}{V_{DC}}$$

with the calculation dependent on the value of $vREF_{position}$ as indicated in Table 1 below.

TABLE 1

| $vREF_{position}$ | Switch Timings |
|---|---|
| $\ldots < \frac{\pi}{3}$ | $T_a = m \cdot \sin\left(\frac{\pi}{3} - vREF_{position}\right) \cdot T_s$ |
| | $T_b = m \cdot \sin(vREF_{position}) \cdot T_s$ |
| $\frac{\pi}{3} \leq \ldots < \frac{2\pi}{3}$ | $T_a = m \cdot \sin\left(vREF_{position} - \frac{\pi}{3}\right) \cdot T_s$ |
| | $T_b = m \cdot \sin\left(\frac{2\pi}{3} - vREF_{position}\right) \cdot T_s$ |
| $\frac{2\pi}{3} \leq \ldots < \pi$ | $T_a = m \cdot \sin(\pi - vREF_{position}) \cdot T_s$ |
| | $T_b = m \cdot \sin\left(vREF_{position} - \frac{2\pi}{3}\right) \cdot T_s$ |
| $\pi \leq \ldots < \frac{4\pi}{3}$ | $T_a = m \cdot \sin(vREF_{position} - \pi) \cdot T_s$ |
| | $T_b = m \cdot \sin\left(\frac{4\pi}{3} - vREF_{position}\right) \cdot T_s$ |
| $\frac{4\pi}{3} \leq \ldots < \frac{5\pi}{3}$ | $T_a = m \cdot \sin\left(\frac{5\pi}{3} - vREF_{position}\right) \cdot T_s$ |
| | $T_b = m \cdot \sin\left(vREF_{position} - \frac{4\pi}{3}\right) \cdot T_s$ |
| $\frac{5\pi}{3} \leq \ldots < 2\pi$ | $T_a = m \cdot \sin\left(vREF_{position} - \frac{5\pi}{3}\right) \cdot T_s$ |
| | $T_b = m \cdot \sin(-vREF_{position}) \cdot T_s$ |

The values of the switch timings $T_a$, $T_b$, $T_0$ are passed to the switching controller 44, which controls the six power switches Q1-Q6 of the inverter 30 using space vector pulse width modulation based on the switching timings $T_a$, $T_b$, $T_0$. For traditional space vector pulse width modulation four voltage vectors are utilised v0 (000), v7 (111) and the two voltage vectors neighbouring the reference voltage vector as defined by $VREF_{position}$, with a 0 indicating a low-side one of the corresponding six power switches Q1-Q6 conducting, and a 1 indicating a high-side one of the corresponding six power switches Q1-Q6 conducting. Thus, for example, for the voltage vector V1, the high-side switch corresponding to phase A is conducting, whilst the low-side switches for phase B and phase C are conducting.

Example timings for traditional seven-step space vector pulse width modulation when $vREF_{position}$ is less than $\pi/3$ are: v0 is applied for times T1 and T8, v1 is applied for times T2 and T7, v2 is applied for times T3 and T6, and v7 is applied for times T4 and T5, with the timing relationships shown below:

$$T3 = T6 = T_b/2$$

$$T2 = T7 = T_a/2$$

$$T1 = T8 = T4 = T5 = T_0/4$$

Figure 2:
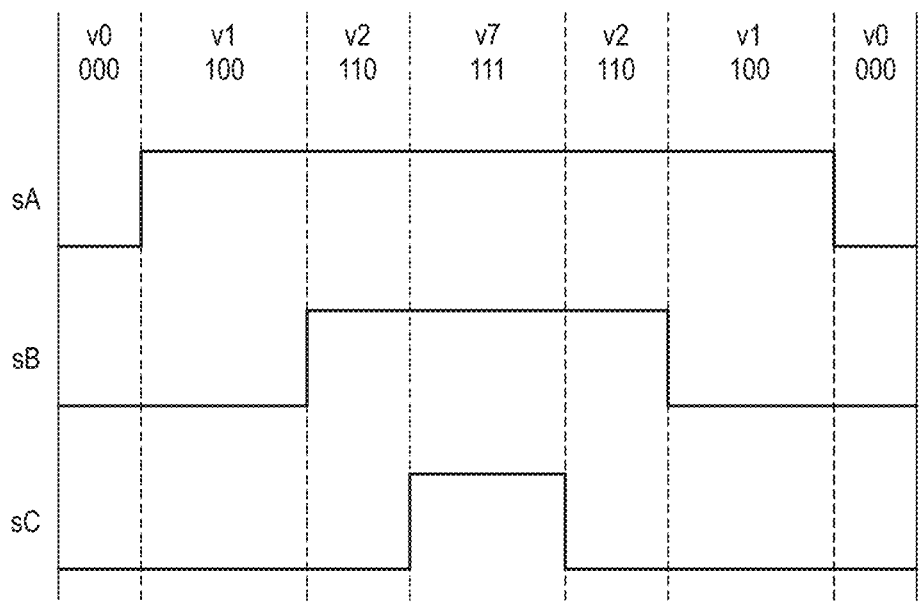
FIG. 2 is a schematic illustration of seven-step space vector pulse width modulation.
Figure 3:
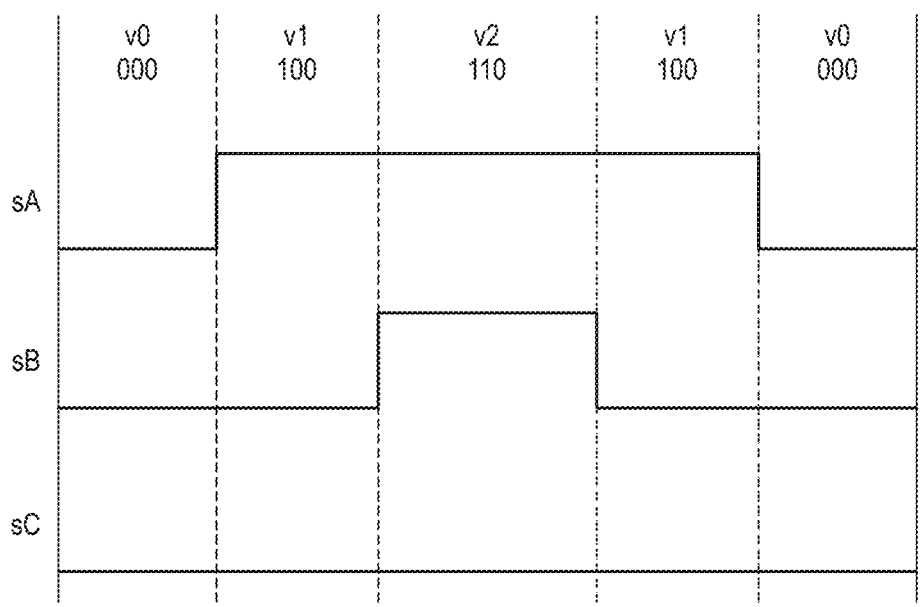
FIG. 3 is a schematic illustration of five-step space vector pulse width modulation for use with the motor system of FIG. 1.

An example illustrating the switching for such traditional space vector pulse width modulation using seven-step space vector pulse width modulation is illustrated in FIG. 2. For reasons that will be discussed hereinafter, the present invention more desirably makes use of five-step space vector pulse width modulation, in which the voltage vector v7 (111) (all high-side switches conducting and high-side freewheeling taking place) is not utilised. An example illustrating the switching for five-step space vector pulse width modulation is illustrated in FIG. 3.

In the manner described above, the controller 34 is able to control switching of the six power switches Q1-Q6 such that appropriate voltages are applied to drive rotation of the rotor 18.

It will be appreciated from the discussion above that in order to control rotation of the rotor 18, knowledge of the rotor position and rotor speed is needed. As will now be discussed, the controller 34 employs a sensorless scheme for estimating position and speed of the rotor 18, and controls operation of the power switches Q1-Q6 of the inverter 30 in response to the estimated position and speed of the rotor 18.

To employ the sensorless scheme, as shown in FIG. 1, the controller 34 comprises the rotor position calculator 46. The rotor position calculator 46 includes a zero-crossing estimator 48, an electrical period calculator 50, and a position signal generator 52.

In the embodiment of FIG. 1, only values relating to phase winding A are utilised, although it will be appreciated that the following discussion could equally apply to phase winding B or phase winding C. Furthermore, embodiments are also envisaged, as will be outlined hereafter, where values relating to multiple phase windings are utilised.

In the absence of any significant saturation or saliency, the voltage equation for any of the phase windings 22 may be expressed as $$-E_{phX} = I_{phX} R_{phX} + (L_{selfphX} - L_{mutualphX}) \frac{dI_{phX}}{dt} - V_{phX}$$

where $E_{phX}$ is the back EMF induced in the phase winding X, $L_{selfphX}$ is the self-inductance of the phase winding X, $L_{mutualphX}$ is the mutual inductance of the phase winding X with other phase windings of the motor, $I_{phX}$ is the current value indicative of current flowing through the phase winding X, $R_{phX}$ is the resistance of the phase winding X, and $V_{phX}$ is the reference voltage value indicative of the voltage applied to the phase winding X.

The zero-crossing estimator 48 uses this voltage equation to estimate zero-crossings of back EMF in phase winding A, as will now be described.

The zero-crossing estimator 48 receives a signal, $I_A$, representing a current value indicative of current flowing through phase winding A, from the shunt resistor $R_{shuntA}$. The zero-crossing estimator 48 also receives the desired voltage phase $\delta^*$ from the 3D lookup table 38, and the orthogonal voltage $v_\alpha^*$ from the voltage reference generator. In the orthogonal representation on $\alpha$-$\beta$ axes of the voltages to be applied to each of the three phase windings, the orthogonal voltage $v_\alpha^*$ corresponds to the voltage applied to phase winding A, and so $v_\alpha^*$ may be taken as reference voltage value indicative of a voltage applied to phase winding A without further manipulation. Where phase windings B and/or C are utilised, further manipulation of the orthogonal voltages $v_\alpha^*$ and $v_\beta^*$ may be required to obtain reference voltage values indicative of the voltages applied to phase winding B or C.

The zero-crossing estimator 48 further receives a previously estimated rotor position signal $\theta_e$ from the position signal generator 52. This enables the rotor position signal to be updated based on the outputs from the zero-crossing estimator 48.

Using the self-inductance, $L_{selfphA}$, the mutual inductance of the phase winding A with other phase windings of the motor $L_{mutualphA}$, and the resistance, $R_{phA}$, of the phase winding A, which are known quantities, in combination with the signal, $I_A$, which is the current value indicative of current flowing through the phase winding A, and the orthogonal voltage $v_\alpha^*$, which is the reference voltage value indicative of the voltage applied to the phase winding A, the zero-crossing estimator 48 is able to determine zero-crossing points of back EMF induced in the phase winding A in the following manner.

Integrating the voltage equation gives the relationship representative of integrated back EMF below:

$$\int_{-a}^{a} -E(t)dt = R\int_{-a}^{a} I_A(t)dt + L_{self}(I_A(a) - I_A(-a)) - L_{mutual}(I_A(a) - I_A(-a)) - \int_{-a}^{a} v_\alpha^*(t)dt$$

where $-a$ and $a$ are boundary values at the beginning and end of a measurement interval. This value is denoted as $Bemf_{integ}$.

The back EMF induced in the phase winding 22 can also be fairly accurately approximated by a sinusoidal waveform having the following equation:

$$E(t) = A\sin(\omega t - \varphi) + noise(t)$$

where E(t) is the back EMF, A is the amplitude of the back EMF, $\omega$ is the angular frequency of the back EMF in radians per second, and $\varphi$ is the phase of the back EMF in radians. Noise(t) represents any noise present in the back EMF signal. The integral of the noise component of the back EMF equation approximates to zero, and hence can effectively be ignored.

If we let Fs be the sampling frequency over a measurement interval from $-h$ to $h$, we let s be the time in samples, and t be the time in seconds, such that $s = Fst$, then the value $Bemf_{integ\_norm}$, can also be written as the estimated integral of the sinusoidal back EMF waveform on the interval $[-h, h]$ in samples:

$$Bemf_{integ} = \int_{-h}^{h} E(s)ds = \int_{-h}^{h} A\sin\left(\omega\frac{s}{F_s} - \varphi\right)ds$$

If we substitute $s = (Fs/\omega)x$, then we get:

$$Bemf_{integ} = \int_{-h\frac{\omega}{F_s}}^{h\frac{\omega}{F_s}} A\sin(x - \varphi)\frac{F_s}{\omega}dx = A\frac{F_s}{\omega}\int_{-h\frac{\omega}{F_s}}^{h\frac{\omega}{F_s}} \sin(x - \varphi)dx$$

It can be seen that a normalisation constant for the integral given above is $A \cdot (Fs/\omega)$, where Fs is the sampling frequency. It can also be observed that the integration limit $$h\frac{\omega}{F_s}$$

is half of the measurement interval expressed as the angle of back EMF in radians.

The amplitude, A, depends linearly on the motor speed and is commonly expressed via the motor-specific constant $M_{100K}$, which is the amplitude in volts at the speed of 100,000 RPM. This constant depends on the motor construction, varies slightly with temperature, and can be determined by characterisation during a resynchronisation phase of the motor 12. The amplitude is thus given by:

$$A = M \cdot 10^3 \frac{f_{RPM}}{10^5} = M\frac{10^3 \cdot 60 \cdot f}{pp \cdot 10^5}$$

where $f_{RPM}$ is the motor speed in RPM, and pp is the pole pair number of the rotor (in the present case 1).

The normalisation constant for the integral of the back EMF therefore becomes:

$$A\frac{F_s}{\omega} = A\frac{F_s}{2\pi f} = M\frac{10^3 \cdot 60 \cdot F_s}{2\pi \cdot pp \cdot 10^5}$$

The expression $(60\ F_s)/(pp \cdot 10^5)$ equals the number of samples per electrical period at 100,000 RPM for a four-pole motor, i.e. at the speed for which the M constant is specified. This can be thought of as the frequency normalisation factor, whereas $M \cdot 10^3$ can be thought of as the amplitude normalisation factor.

Thus it can be seen from that for known values amplitude and frequency of back EMF, we can calculate the phase of the back EMF induced in the phase winding using the following relationship:

$$\sin\varphi = \frac{A\frac{F_s}{\omega}\int_{-h\frac{\omega}{F_s}}^{h\frac{\omega}{F_s}} \sin(x - \varphi)dx}{2\sin\left(h\frac{\omega}{F_s}\right)}$$

for unit amplitude, and a period of $2\pi$.

From the integration of the back EMF equation above, we know that:

$$\sin\varphi = \frac{A\frac{F_s}{\omega}\int_{-h\frac{\omega}{F_s}}^{h\frac{\omega}{F_s}} \sin(x - \varphi)dx}{2\sin\left(h\frac{\omega}{F_s}\right)} =$$

$$\frac{R\int_{-a}^{a} I_A(t)dt + L_{self}(I_A(a) - I_A(-a))L_{mutual}(I_A(a) - I_A(-a)) - \int_{-a}^{a} v_\alpha^*(t)dt}{2\sin\left(h\frac{\omega}{F_s}\right)}$$

Then by utilising the values for the current value indicative of current flowing through the phase winding, the reference voltage value indicative of the voltage applied to the phase winding, and converting the argument of the denominator into radians, we can determine a value for sin φ. The phase, φ, is then obtained by applying the arcsin function.

Once the phase has been calculated, known amplitude and/or frequency values stored in memory for the given rotor speed, or indeed calculated amplitude and/or frequency values for the given rotor speed, can be used in combination with the phase to determine zero-crossing points of back EMF induced in the phase winding 22, for example using a representation of the back EMF waveform.

Figure 4:
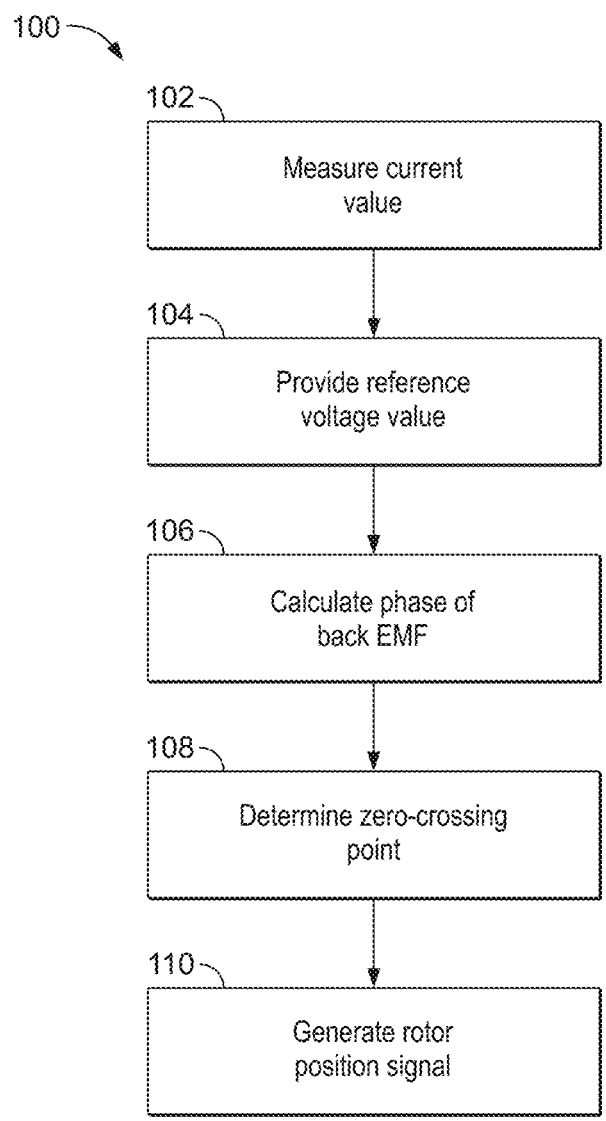
FIG. 4 is a flow diagram illustrating a method of controlling the motor system of FIG. 1.

A method 100 of determining the position of the rotor 18 is illustrated in the flow diagram of FIG. 4.

The method 100 comprises measuring 102 a current value indicative of current flowing through the phase winding A, and providing 104 a reference voltage value indicative of a voltage applied to the phase winding A. The method 100 comprises calculating 106 a phase of back EMF induced in the phase winding A using the measured current value and the reference voltage value, and determining 108 a zero-crossing point of the back EMF induced in the phase winding using the calculated phase of back EMF induced in the phase winding. The method comprises and using 110 the calculated phase of back EMF induced in the phase winding to generate a rotor position signal.

Knowledge of the zero-crossing points of back EMF induced in the phase winding 22 allows calculation of various values which can be used by the electrical period calculator 50, and the position signal generator 52 to generate the estimated rotor position signal $\theta_e$. In particular, the zero-crossing estimator 48 outputs values for the time period from the previous back EMF zero-crossing point to the start of the most recent sampling period, bemfzc_to_sofs, and the time period from the previous back EMF zero-crossing point to the end of the most recent sampling period, bemfzc_to_eofs, with bemfzc_to_sofs and bemfzc_to_eofs output to the electrical period calculator 50, along with an indication of which phase was sampled, Ph_sampled, which in this case is phase A.

The mid-period angle of the sampling period relative to a previous zero-crossing of back EMf, mid_period_angle, can be calculated using the arcsin function dependent on the value of sin φ:

sin φ≤1→arcsin(sin φ−1)=mid_period_angle sin φ>1→arcsin(sin φ−1)+90°=mid_period_angle A mid-period time, mid_period_time, is derived from the following:

$$\text{mid\_period\_time} = \text{mid\_period\_angle} \cdot \frac{T_{a\_old}}{360}$$

where $T_{a\_old}$ is a previously known or previously calculated electrical period. Then the time period from the previous back EMF zero-crossing point to the start of the most recent sampling period, bemfzc_to_sofs, and the time period from the previous back EMF zero-crossing point to the end of the most recent sampling period, bemfzc_to_eofs, are then calculated by:

$$\text{bemfZC\_to\_sofs} = \text{mid\_period\_time} - \frac{N}{2} \cdot T_s$$

$$\text{bemfZC\_to\_eofs} = \text{mid\_period\_time} + \frac{N}{2} \cdot T_s$$

with these values being passed to the electrical period calculator 50.

The electrical period calculator 50 calculates the electrical period between zero-crossings of back EMF induced in the phase winding 22 using the following:

$Ta_{period}$=bemfZC_to_eofs$_{old}$+deltaT−bemfZC_to_eofs where bemfZC_to_eofs$_{old}$ is a previously calculated time period from a previously calculated or known back EMF zero crossing to the end of a previous sampling period, and deltaT is given by deltaT=timer$_{endA}$−timer$_{endA\_old}$, where timer$_{endA}$ is the timer value at the end of sampling.

The electrical period calculator 50 outputs the calculated electrical period, $Ta_{period}$, and the time period from the previous back EMF zero-crossing point to the end of the most recent sampling period, bemfzc_to_eofs, which is also referred to as the phase delay, phaseA$_{delay}$, to the position signal generator 52, whilst also using the calculated rotor speed, given by $$\omega_a = \frac{2\pi}{Ta_{period}},$$

to index the 3D lookup table 38.

The position signal generator 52 generates the estimated rotor position signal $\theta_e$ using the following relationship:

$$\theta_e = \text{mod}\left(\frac{2\pi}{Ta_{period}} \cdot (t + \text{phase } A_{delay}), 2\pi\right)$$

where t is the running time which is reset to zero at the end of the sampling period, ie at timer$_{endA}$.

The estimated rotor position signal $\theta_e$ is referenced from a negative to a positive zero-crossing of the back EMF induced in phase winding A, with the estimated rotor position signal $\theta_e$ being passed to the voltage reference generator 40 to be used to control the motor 12 as discussed above.

Figure 5:
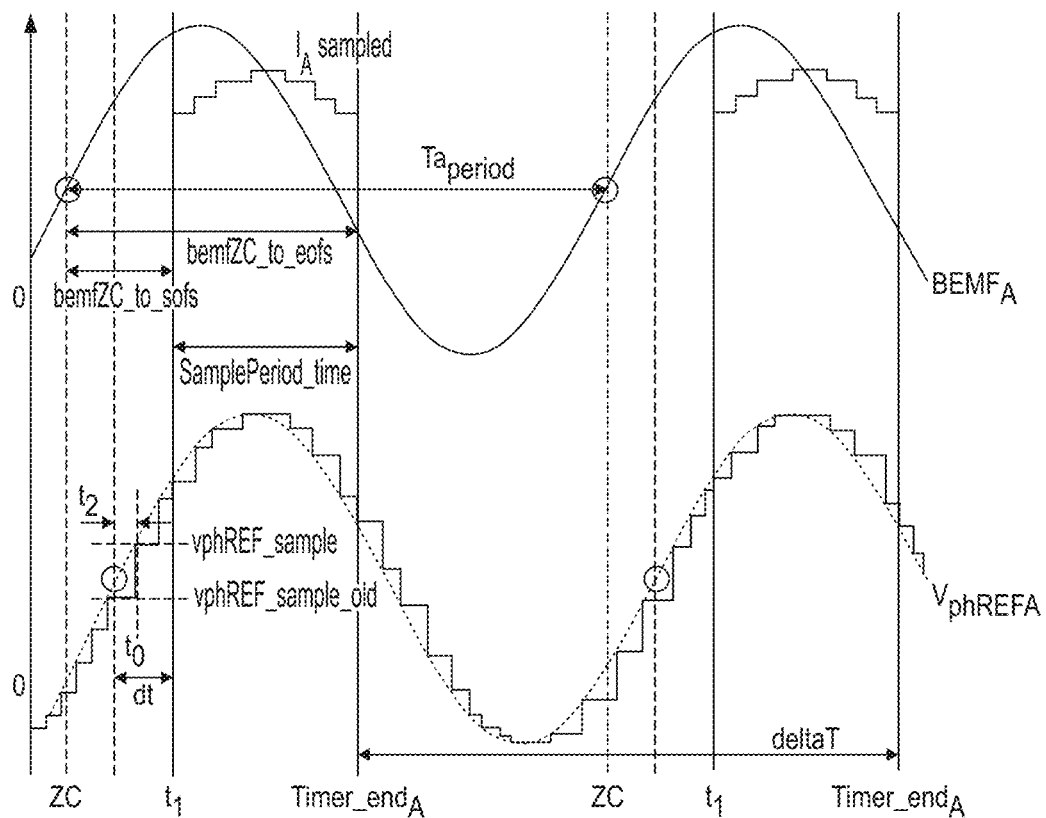
FIG. 5 is a first diagram illustrating waveforms utilised in controlling the motor system of FIG. 1.
Figure 6:
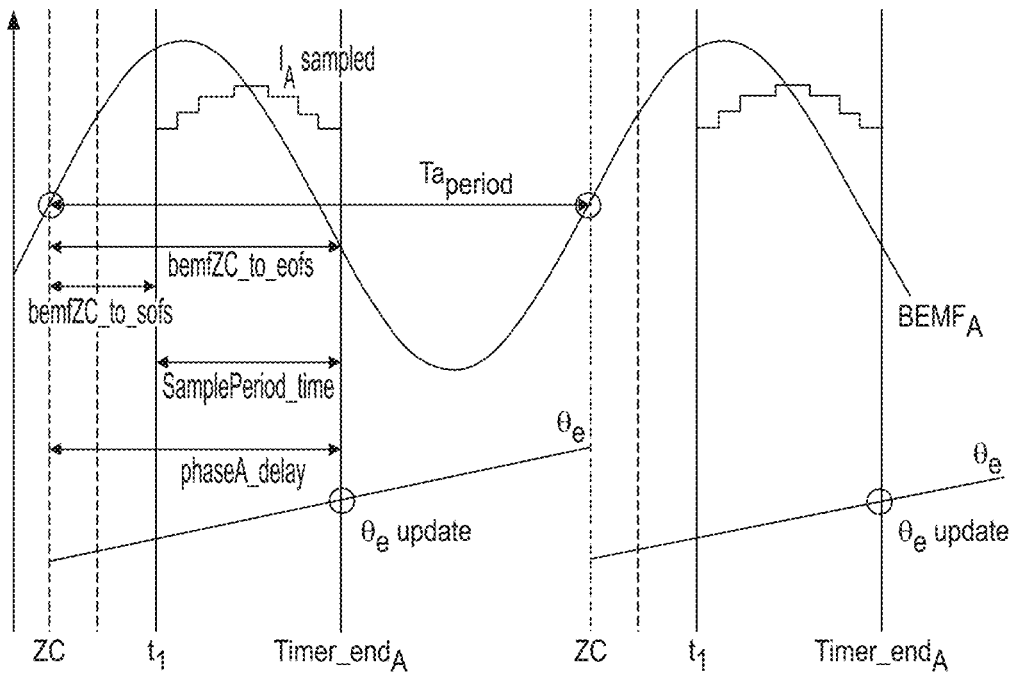
FIG. 6 is a second diagram illustrating waveforms utilised in controlling the motor system of FIG. 1.

In such a manner, the controller 34 may obtain an estimated rotor position signal $\theta_e$ in a sensorless manner, without requiring either a sensor or additional hardware components. The relationships between the various time periods discussed above can be seen in FIGS. 5 and 6.

In control of brushless permanent magnet motors, it is common to apply an acceleration control scheme to accelerate the motor quickly to a certain speed, before applying a different control scheme. The method 100 described above is typically only employed once the rotor 18 has been accelerated to a certain speed, for example a speed in excess of 40 krpm, and hence the controller 34 is required to transition from the initial acceleration control scheme (details of which are not pertinent to the present invention, and which may take many forms) to the method 100.

From the discussion of the method 100 above it will be appreciated that the estimated rotor position signal $\theta_e$ output by the controller 34 is the function of its previous output, and hence that an initial back emf value and initial rotor speed value are needed to implement the control in the manner described above. In certain acceleration control schemes, accurate determination of the back emf value and rotor speed are not possible.

Thus in some embodiments the method 100 of the present invention includes an initialisation step. The initialisation step includes implementation of a so-called "resynchronisation period" in which the power switches Q1-Q6 are turned off. In such a period the back emf induced in the phase windings 22 is equal to the phase voltage, and hence zero-crossings of back emf can be monitored by monitoring the phase voltage. The resynchronisation period typically lasts for a period sufficient to determine two consecutive zero-crossings of the same polarity transition (ie two zero-crossings where the phase voltage transitions from positive to negative, or two zero-crossings where the phase voltage transitions from negative to positive), and this allows determination of the speed of the rotor 18 from these two consecutive zero-crossings.

The latter back emf zero-crossing determined during the resynchronisation period and the rotor speed can be used as initialisation values for the algorithms described in relation to the method 100 above.

Although described above in relation to two consecutive zero-crossings of the same polarity transition, it will be appreciated that two consecutive zero-crossings of different polarity transitions (ie one negative to positive and one positive to negative, or vice versa), or indeed that non-consecutive zero-crossings may be utilised to determine the initialisation values, with the calculation for speed of the rotor 18 being modified accordingly.

In the embodiment of FIG. 1, only phase winding A is utilised in the generation of the estimated rotor position signal $\theta_e$, and the estimated rotor position signal $\theta_e$ is only updated once per 360 electrical degrees, ie once per back EMF cycle.

Figure 7:
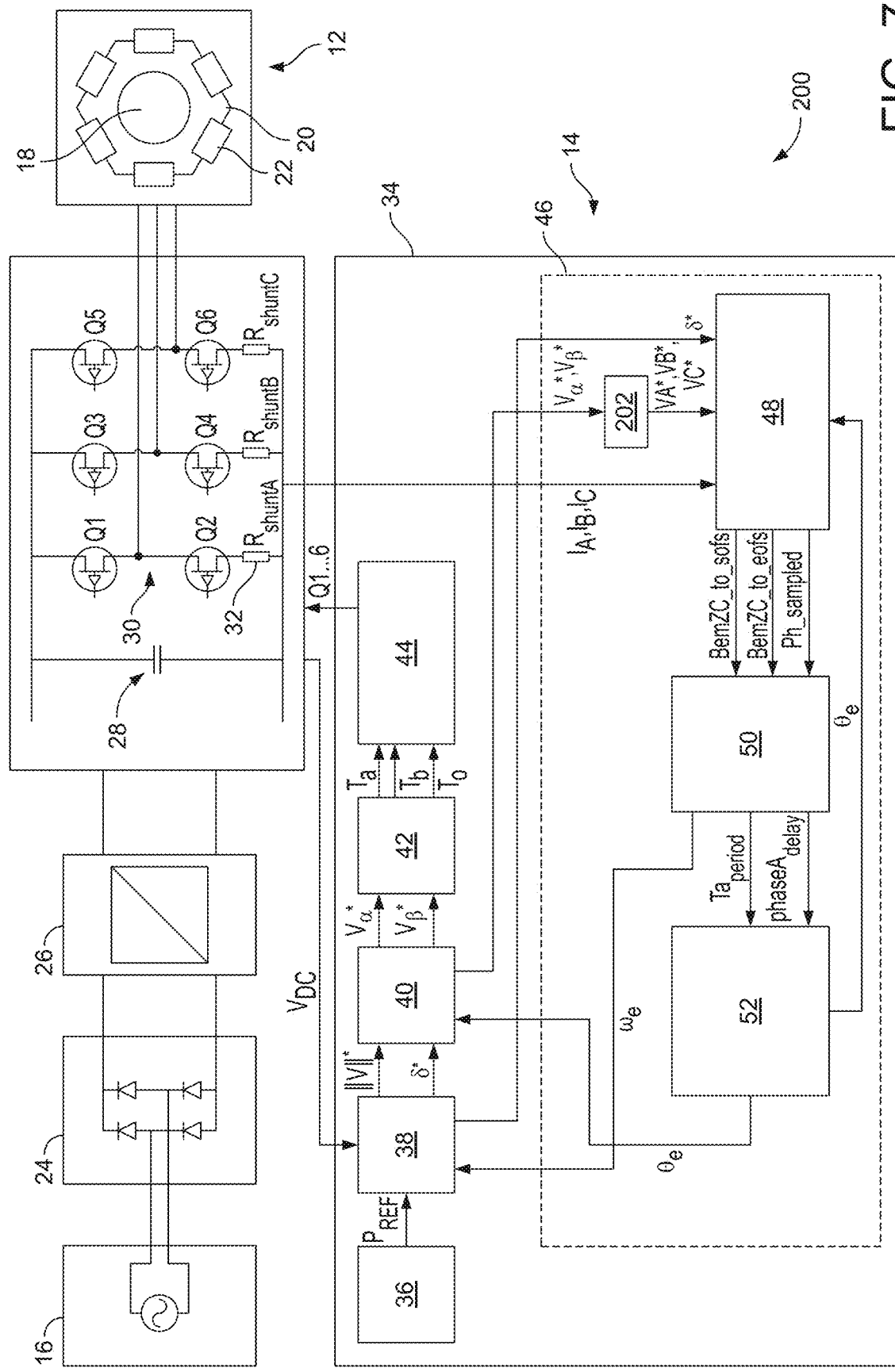
FIG. 7 is a schematic diagram illustrating a further embodiment of a motor system according to the present invention.

In an alternative embodiment, such as the embodiment of FIG. 7, phase windings B and C are also utilised in the generation of the estimated rotor position signal $\theta_e$.

The majority of the motor system 200 of FIG. 7 is the same as the motor system 10 of FIG. 1, and like reference numerals will be used for the sake of clarity.

The motor system 200 of FIG. 7 differs from the motor system 10 of FIG. 1 in that the current sensor 32 in FIG. 7 comprises three shunt resistors $R_{shuntA}$, $R_{shuntB}$, $R_{shuntC}$, with each shunt resistor located on a low side of the leg of the inverter 30 corresponding the respective phase winding. The controller 34 of the motor system 200 comprises an additional control block in the form of a voltage transformation block 202.

The zero-crossing estimator 48 is to calculate a phase of back EMF induced in each of the phase windings A,B,C and to determine appropriate zero-crossing points in the manner described above, with the calculations for each phase being performed sequentially with around 120 electrical degrees of separation.

To achieve this, the zero-crossing estimator 48 receives signals $I_A$, $I_B$, and $I_C$ from the shunt resistors $R_{shuntA}$, $R_{shuntB}$, $R_{shuntC}$, with each signal $I_A$, $I_B$, and $I_C$ representing a current value indicative of current flowing through the respective phase winding during excitation of that phase winding. In some embodiments, a time-division multiplexer (not-shown) is used to provide signals $I_A$, $I_B$, and $I_C$ to the zero-crossing estimator 48.

The zero-crossing estimator 48 further receives signals $v_A^*$, $v_B^*$, and $v_C^*$ from the voltage transformation block 202. As mentioned above, in the orthogonal representation on α-β axes of the voltages to be applied to each of the three phase windings, the orthogonal voltage $v_\alpha^*$ corresponds to the voltage applied to phase winding A, and so $v_\alpha^*$ may be taken as reference voltage value indicative of a voltage applied to phase winding A without further manipulation. Where phase windings B and/or C are utilised, further manipulation of the orthogonal voltages $v_\alpha^*$ and $v_\beta^*$ may be required to obtain reference voltage values indicative of the voltages applied to phase winding B or C. The voltage transformation block 202 provides this manipulation in the form of an inverse Clark transformation applied to orthogonal voltages $v_\alpha^*$ and $v_\beta^*$ to generate signals $v_A^*$, $v_B^*$, and $v_C^*$, which are sinusoidal waveforms that each are a reference voltage value indicative of a voltage applied to the respective phase winding of the motor during excitation of that phase winding.

Using the signals $I_A$, $I_B$, and $I_C$, and the signals $v_A^*$, $v_B^*$, and $v_C^*$, the controller 34 can update the estimated rotor position signal $\theta_e$ once every 120 electrical degrees, which may provide improved accuracy of position estimation compared to a controller that only updates the estimated rotor position signal $\theta_e$ once every 360 electrical degrees.

Figure 8:
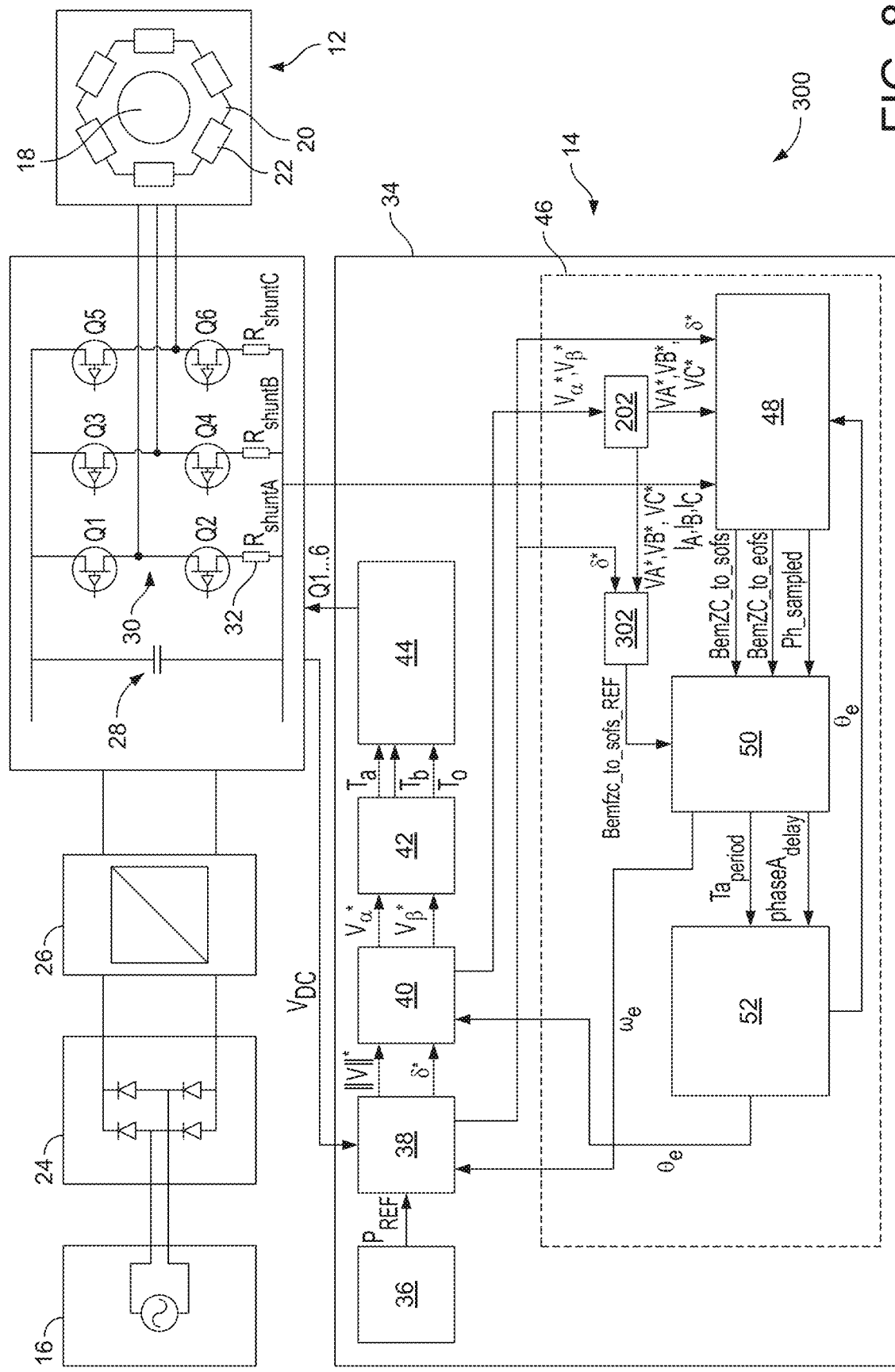
FIG. 8 is a schematic diagram illustrating a further embodiment of a motor system according to the present invention.

A further embodiment of a motor system 300 is illustrated schematically in FIG. 8. The motor system 300 of FIG. 8 has a further control block to the motor system 200 of FIG. 7 in the form of a reference zero-crossing estimator 302. The calculated back EMF zero-crossing points determined by the zero-crossing estimator 48 may not be entirely accurate, for example due to hardware delays and software dead time, and so the reference zero-crossing estimator 302 is to provide a reference back EMF zero-crossing time based on the reference voltage value indicative of a voltage applied to the phase winding, with the reference back EMF zero-crossing time providing an error offset to the estimated back EMF zero-crossing point calculated by the zero-crossing estimator 48.

The reference zero-crossing estimator 302 receives the desired voltage phase δ* from the 3D lookup table 38, and the signals $v_A^*$, $v_B^*$, and $v_C^*$ from the voltage transformation block 202. It will be appreciated that, where only one phase winding 22, for example phase winding A, is used for the back EMF zero-crossing point determination, the reference zero-crossing estimator 302 may instead receive the orthogonal voltage $v_\alpha^*$, from the voltage reference generator 40. Using these values, and associated timing values, the reference zero-crossing estimator 302 calculates a reference value for the back EMF zero-crossing point to the start of the most recent sampling period, $\text{bemfzc\_to\_sofs}_{REF}$ using the equation:

$$\text{bemfZC\_to\_sofs}_{REF} = (dt - v_{phase\_REF\_t})$$

where $V_{phase\_REF\_t}$ is the period between the estimated back EMF zero-crossing point and the zero-crossing point of the reference voltage waveform, and dt is the period from the zero-crossing point of the reference voltage waveform to the start of sampling.

The period between the estimated back EMF zero-crossing point and the zero-crossing point of the reference voltage waveform, $v_{phase\_REF\_t}$, is given by the following equation:

$$v_{phase\_REF\_t} = \frac{\delta^*}{360} \cdot T_{a\_old} + \frac{T_s}{2}$$

where $T_{a\_old}$ is the previous calculate or previous known electrical period, and $T_s$ is $1/f_{sw}$, with $f_{sw}$ being the sampling frequency.

The period from the zero-crossing point of the reference voltage waveform to the start of sampling, dt, is given by:

$$dt = t_1 - t_0 + t_2$$

where $t_0$ is the time at the first sampling point after the reference voltage waveform transitions from a negative value to a positive value, and $t_1$ is the time at the start of sampling.

The value $t_2$ is the time period between the zero-crossing point of the reference voltage waveform and the time at the first sampling point after the reference voltage waveform transitions from a negative value to a positive value, to, and is calculated by the following:

$$t_2 = \frac{v_{phREF\_sample} \cdot T_s}{v_{phREF\_sample} - v_{phREF\_sample\_old}}$$

where $v_{phREF\_sample}$ is the voltage value at the first sampling point after the reference voltage waveform transitions from a negative value to a positive value, and $v_{phREF\_sample\_old}$ is the voltage value at the last sampling point before the reference voltage waveform transitions from a negative value to a positive value.

The reference zero-crossing estimator 302 passes the signal bemfzc_to_sofs$_{REF}$ to the electrical period calculator 50, where it is utilised alongside the calculated time period from the previous back EMF zero-crossing point to the start of the most recent sampling period, bemfzc_to_sofs, and the time period from the previous back EMF zero-crossing point to the end of the most recent sampling period, bemfzc_to_eofs.

In the embodiment of FIG. 8, the electrical period calculator 50 calculates an error offset value, error_offset, which is the difference between the reference time period from the previous back EMF zero-crossing point to the start of the most recent sampling period, bemfzc_to_sofs$_{REF}$, and the calculated time period from the previous back EMF zero-crossing point to the start of the most recent sampling period, bemfzc_to_sofs:

error_offset=bemfZC_to_sofs$_{REF}$−bemfZC_to_sofs

The final determined electrical period, $Ta_{perioddet}$ is then given by:

$Ta_{perioddet}=Ta_{period}+(\text{error}_{offset}-\text{error\_offset}_{old})$ where error_offset$_{old}$ is the previous calculated or known error offset, and $Ta_{period}=\text{bemfZC\_to\_eofs}_{old}+\text{delta}T-\text{bemfZC\_to\_eofs}$ The time period between the estimated back EMF zero-crossing point and the end of sampling is then given by:

phaseA$_{delay}$=bemfZC_to_eofs+error_offset

Figure 9:
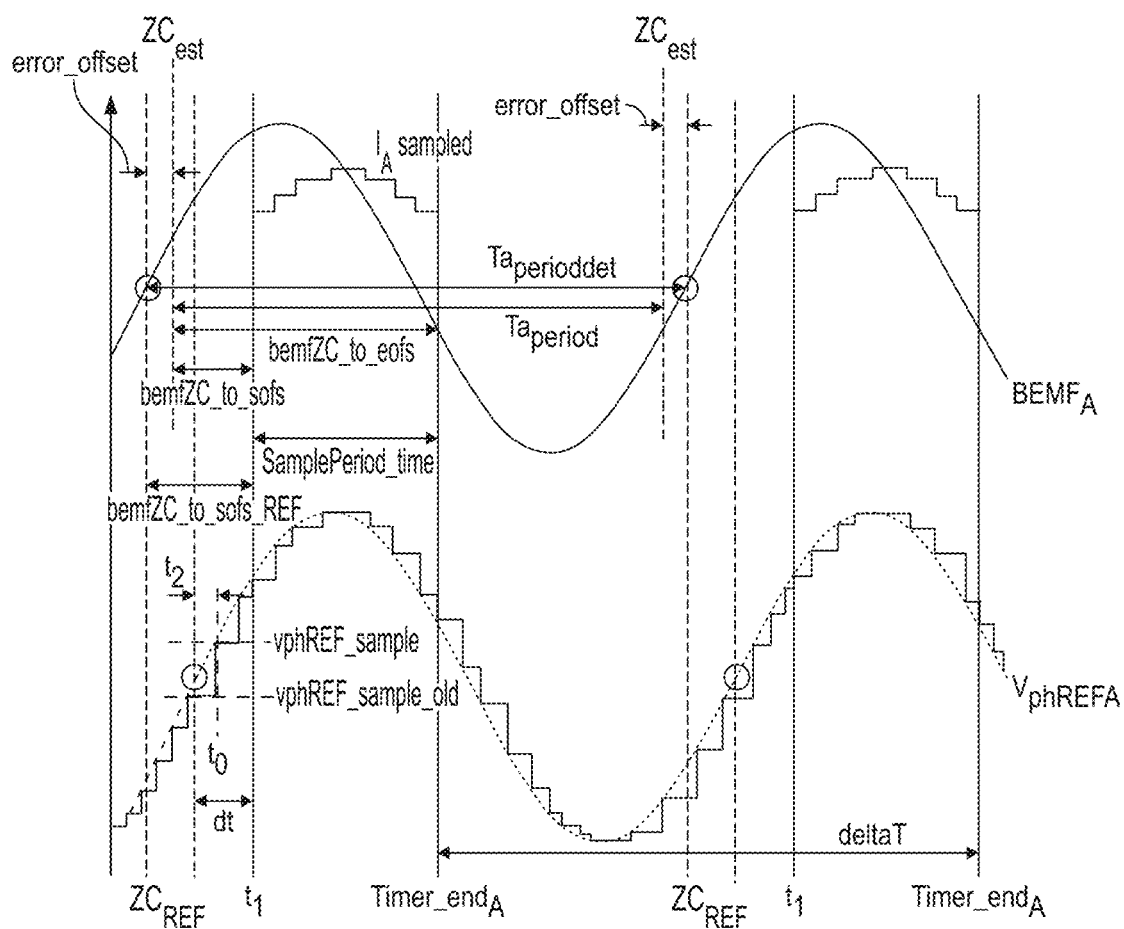
FIG. 9 is a schematic diagram illustrating waveforms utilised in controlling the motor system of FIG. 8.

In such a manner the reference zero-crossing estimator 302 may be used to compensate for errors in the calculated back EMF zero-crossing points determined by the zero-crossing estimator 48, for example due to hardware delays and software dead time. Example waveforms where the reference zero-crossing estimator 302 are used can be seen in FIG. 9, with ZC$_{REF}$ denoting the zero-crossing point estimated using the reference zero-crossing estimator 302, and ZC$_{est}$ denoting the zero-crossing point estimated using the zero-crossing estimator 48.

Figure 10:
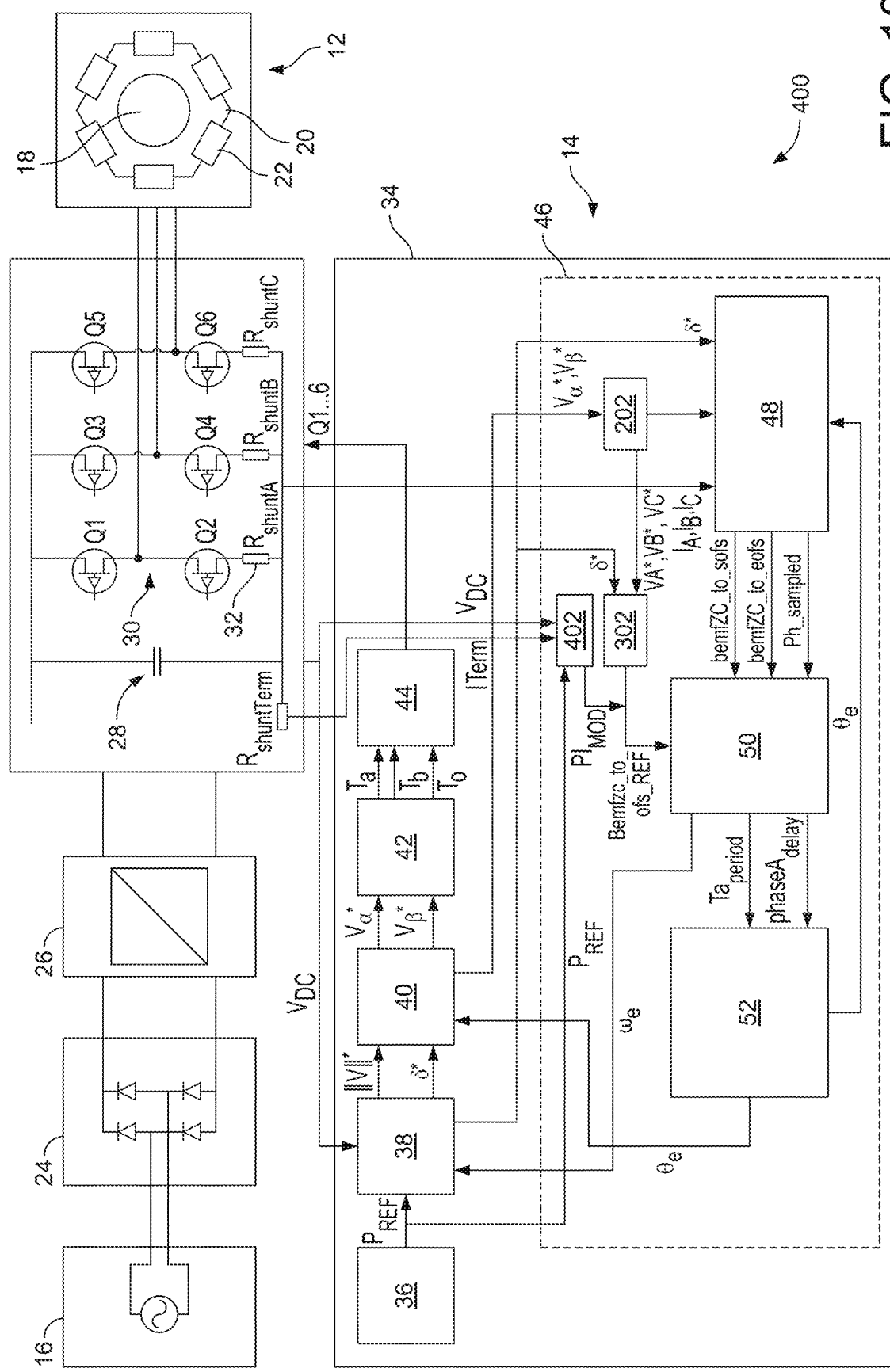
FIG. 10 is a schematic diagram illustrating a further embodiment of a motor system according to the present invention.

A further embodiment of the motor system 400 is shown in FIG. 10. The motor system 400 is substantially the same as the motor system 300 of FIG. 8, save that the motor system 400 of FIG. 10 includes a PI controller 402 that implements a PI control loop. From the discussion above it can be seen that the estimated rotor position signal $\theta_e$ output by the controller is the function of its previous output, which may result in instability in the control.

The PI controller 402 receives the DC link voltage $V_{DC}$ from voltage divider circuit and a terminal current value $I_{Term}$ from a terminal shunt resistor $R_{shuntTerm}$ located on the low side of the inverter 30. The values $V_{DC}$ and $I_{Term}$ are used, along with a motor efficiency map, to calculate an input power $P_{input}$ to the rotor 18. This input power $P_{input}$ is compared by the PI controller 402 to the reference power $P_{REF}$ from the power lookup table 36 to obtain a correction factor PI$_{mod}$, which is applied to the reference value for the back EMF zero-crossing point to the start of the most recent sampling period, bemfzc_to_sofs$_{REF}$ using the equation:

bemfZC_to_sofs$_{REF}$=(dt−$v_{phase\_REF\_t}$)+PI$_{mod}$

This modification impacts on the estimated rotor position signal $\theta_e$ and the calculated rotor speed $\omega_A$, and hence is fed-back to both the indexing of the 3D lookup table 38, and the voltage reference generator 40, and may allow for enhanced stability of control.

Although described above in relation to calculating input power to the rotor 18, it will be appreciated that, for example, the PI control loop may instead utilise DC link power, or other appropriate power values associated with the motor 12, depending on the desired control parameters for the motor.

Whilst the motor systems described above have been described as receiving power from an AC power supply, it will be recognised that the teachings herein are also applicable to motor systems that receive power from a DC power supply, with appropriate modification that will be apparent to a person skilled in the art.

It will further be appreciated that any measured values discussed herein, for example $I_A$, $I_B$, $I_C$, $V_{DC}$, or any generated signals discussed herein, for example error_offset, phaseA$_{delay}$, $\omega_e$, or $\theta_e$, may be filtered or averaged to reduce noise and erroneous spikes or to improve stability.

The invention claimed is:

1. A method of determining a position of a rotor of a brushless permanent magnet motor, the method comprising:
   measuring a current value indicative of current flowing through a phase winding of the motor during excitation of the phase winding,
   providing a reference voltage value indicative of a voltage applied to the phase winding of the motor during excitation of the phase winding,
   calculating a phase of back EMF induced in the phase winding using the measured current value and the reference voltage value,
   determining a zero-crossing point of the back EMF induced in the phase winding using the calculated phase of back EMF induced in the phase winding, and
   generating a position signal of the rotor based on the determined zero-crossing point, and
   wherein the phase of back EMF induced in the phase winding is calculated using the equation:

$$-E_{phX} \propto I_{phX}R_{phX} + (L_{self\,phX} - L_{mutual\,phX})\frac{dI_{phX}}{dt} - V_{phX};$$

where $E_{phX}$ is the back EMF induced in the phase winding X, $L_{self\,phX}$ is the self-inductance of the phase winding X, $L_{mutual\,phX}$ is the mutual inductance of the phase winding X with other phase windings of the motor, $I_{phX}$ is the current value indicative of current flowing through the phase winding X, $R_{phX}$ is the resistance of the phase winding X, and $V_{phX}$ is the reference voltage value indicative of the voltage applied to the phase winding X.

2. The method as claimed in claim 1, wherein determining a zero-crossing point of the back EMF induced in the phase winding comprises utilising any of a calculated phase of back EMF induced in the phase winding, an amplitude representative of the amplitude of back EMF induced in the phase winding, and a frequency representative of the frequency of back EMF induced in the phase winding.

3. The method as claimed in claim 1, wherein calculating a phase of back EMF induced in the phase winding comprises integrating the equation:

$$-E_{phX} \propto I_{phX} R_{phX} + (L_{self\,phX} - L_{mutual\,phX}) \frac{dI_{phX}}{dt} - V_{phX};$$

to obtain a relationship representative of integrated back EMF.

4. The method as claimed in claim 3, wherein calculating a phase of back EMF induced in the phase winding comprises equating integrated back EMF to an integral of a sinusoidal waveform representative of back EMF induced in the phase winding.

5. The method as claimed in claim 3, wherein calculating a phase of back EMF induced in the phase winding comprises equating a relationship representative of integrated back EMF with an integral of a sinusoidal waveform representative of back EMF induced in the phase winding.

6. The method as claimed in claim 1, wherein the method comprises utilising a determined zero-crossing point of back EMF induced in the phase winding to calculate an electrical period of the rotor.

7. The method as claimed in claim 1, wherein the method comprises utilising a determined zero-crossing point of back EMF induced in the phase winding to calculate a speed of the rotor.

8. The method as claimed in claim 1, wherein the method comprises utilising a determined zero-crossing point of back EMF induced in the phase winding to generate a signal representing continuous position of the rotor.

9. The method as claimed in claim 8, wherein the method comprises controlling a voltage applied to the phase winding of the motor based on the signal representing continuous position of the rotor.

10. The method as claimed in claim 9, wherein the method comprises controlling the voltage applied to the phase winding of the motor using space vector pulse width modulation.

11. The method as claimed in claim 10, wherein the method comprises controlling the voltage using 5-step space vector pulse width modulation.

12. The method as claimed in claim 1, wherein the method comprises obtaining the reference voltage value from a look-up table based on at least one of a measured DC link voltage and a calculated rotor speed.

13. The method as claimed in claim 1, wherein the reference voltage value comprises a sinusoidal voltage value.

14. The method as claimed in claim 1, wherein the method comprises calculating a reference back EMF waveform, and calculating an error offset for the determined zero-crossing point of back EMF induced in the phase winding using the reference back EMF waveform.

15. The method as claimed in claim 14, wherein the calculated reference back EMF waveform is dependent on the reference voltage value.

16. The method as claimed in claim 1, wherein the method further comprises controlling the brushless permanent magnet motor to obtain a desired rotor power using a closed feedback loop.

17. The method as claimed in claim 1, wherein the brushless permanent magnet motor comprises a plurality of phase windings, and the method comprises measuring the current value indicative of current flowing through only one phase winding of the motor, providing the reference voltage value indicative of a voltage applied to the only one phase winding of the motor, calculating the phase of back EMF induced in the only phase winding using the measured current value and the reference voltage value, determining the zero-crossing point of the back EMF induced in the only one phase winding using the calculated phase of back EMF induced in the phase winding, and generating the rotor position signal based on the determined zero-crossing point.

18. The method as claimed in claim 1, wherein the brushless permanent magnet motor comprises a plurality of phase windings, and the method comprises measuring a plurality of current values each indicative of current flowing through a respective phase winding of the motor, providing a plurality of reference voltage values each indicative of a voltage applied to the respective phase winding of the motor, calculating a phase of back EMF induced in each phase winding using the respective measured current value and the respective reference voltage value, determining a zero-crossing point of the back EMF induced in each phase winding using the calculated phase of back EMF induced in the phase winding, and generating a rotor position signal based on the determined zero-crossing points.

19. The method as claimed in claim 1, wherein the method comprises determining an initial back emf zero-crossing point and an initial rotor speed in an initialisation step, and generating the rotor position signal based on the initial back emf zero-crossing point and the initial rotor speed.

20. The method as claimed in claim 19, wherein determining the initial back emf zero-crossing point comprises turning off all power switches of the brushless permanent magnet motor, monitoring a phase voltage of the phase winding of the motor, and utilising a zero-crossing point of the phase voltage as the initial back emf zero-crossing point.

21. The method as claimed in claim 20, wherein determining the initial back emf zero-crossing point comprises turning off all power switches of the brushless permanent magnet motor, monitoring the phase voltage of the phase winding of the motor to determine at least two zero-crossing points of the phase voltage, and utilising the most recent zero-crossing point of the phase voltage as the initial back emf zero-crossing point.

22. The method as claimed in claim 21, wherein determining the initial rotor speed comprises utilising the most recent zero-crossing point of the phase voltage and a previously determined zero-crossing point of the phase voltage, and calculating a time period between the most recent zero-crossing point of the phase voltage and the previously determined zero-crossing point of the phase voltage.

23. A brushless permanent magnet motor comprising a controller configured to:
   obtain a current value indicative of current flowing through a phase winding of the motor during excitation of the phase winding, obtain a reference voltage value indicative of a voltage applied to the phase winding of the motor during excitation of the phase winding, calculate a phase of back EMF induced in the phase winding using the measured current value and the reference voltage value, determine a zero-crossing point of the back EMF induced in the phase winding using the calculated phase of back EMF induced in the phase winding, and generate a position signal of the rotor based on the determined zero-crossing point, and wherein the phase of back EMF induced in the phase winding is calculated using the equation:

$$-E_{phX} \propto I_{phX} R_{phX} + (L_{selfphX} - L_{mutualphX}) \frac{dI_{phX}}{dt} - V_{phX};$$

where $E_{phX}$ is the back EMF induced in the phase winding X, $L_{selfphX}$ is the self-inductance of the phase winding X, $L_{mutualphX}$ is the mutual inductance of the phase winding X with other phase windings of the motor, $I_{phX}$ is the current value indicative of current flowing through the phase winding X, $R_{phX}$ is the resistance of the phase winding X, and $V_{phX}$ is the reference voltage value indicative of the voltage applied to the phase winding X.

24. A data carrier comprising machine readable instructions for the operation of a controller of a brushless permanent magnet motor to:

obtain a current value indicative of current flowing through a phase winding of the motor during excitation of the phase winding, obtain a reference voltage value indicative of a voltage applied to the phase winding of the motor during excitation of the phase winding, calculate a phase of back EMF induced in the phase winding using the measured current value and the reference voltage value, determine a zero-crossing point of the back EMF induced in the phase winding using the calculated phase of back EMF induced in the phase winding, and generate a position signal of the rotor based on the determined zero-crossing point, and wherein the phase of back EMF induced in the phase winding is calculated using the equation:

$$-E_{phX} \propto I_{phX} R_{phX} + (L_{selfphX} - L_{mutualphX}) \frac{dI_{phX}}{dt} - V_{phX};$$

where $E_{phX}$ is the back EMF induced in the phase winding X, $L_{selfphX}$ is the self-inductance of the phase winding X, $L_{mutualphX}$ is the mutual inductance of the phase winding X with other phase windings of the motor, $I_{phX}$ is the current value indicative of current flowing through the phase winding X, $R_{phX}$ is the resistance of the phase winding X, and $V_{phX}$ is the reference voltage value indicative of the voltage applied to the phase winding X.

* * * * *